United States Patent [19]
Hvolka

[11] Patent Number: 5,147,011
[45] Date of Patent: Sep. 15, 1992

[54] MULTI-PURPOSE UNI-BODY DIGGING SERVICE VEHICLE

[75] Inventor: Dusan J. Hvolka, Salt Lake City, Utah

[73] Assignee: DJH Engineering Center, Inc., Salt Lake City, Utah

[21] Appl. No.: 726,776

[22] Filed: Jul. 8, 1991

Related U.S. Application Data

[63] Continuation-in-part of Ser. No. 568,767, Aug. 17, 1990, now U.S. Pat. No. 5,082,082, 359,277, May 31, 1989, and 140,671, Jan. 4, 1988, both now abandoned.

[51] Int. Cl.$^5$ ............................................. B60K 17/358
[52] U.S. Cl. ...................... 180/234; 180/242; 298/1 A; 414/493; 37/126 R; 37/DIG. 4; 37/DIG. 5
[58] Field of Search .............. 180/234, 89.1, 311, 180/317, 242; 298/1 A; 414/489, 491, 492, 493, 565; 37/4, 126 R, DIG. 4, DIG. 5, DIG. 9

[56] References Cited

U.S. PATENT DOCUMENTS

| | | | |
|---|---|---|---|
| 2,795,872 | 6/1957 | Wardle | 37/126 R |
| 3,105,311 | 10/1963 | Hait | 414/493 X |
| 3,235,983 | 2/1966 | Wilson | 414/493 X |
| 4,556,356 | 12/1985 | Niva | 414/458 |
| 5,082,082 | 1/1992 | Hvolka | 180/234 |

FOREIGN PATENT DOCUMENTS 1059656 2/1967 United Kingdom ............... 414/565

Primary Examiner—Charles A. Marmor
Assistant Examiner—Kevin Hurley
Attorney, Agent, or Firm—Marcus G. Theodore

[57] ABSTRACT

A U-shaped multi-purpose uni-body digging service vehicle particularly adapted for transport and hauling comprising: a U-shaped frame having opposing sides and front ends connected by a front piece, and rear ends defining an open interior space in communcation with an open front end; an open top earthmover digging and carrying module structured to fit within and mounted within the interior of the opening of the U-shaped frame to carry loads, wheel mounts capable of pivoting attached to the opposing sides; a plurality of wheels independently suspended and rotatably attached to the wheel mounts; pivot means associated with the wheel mounts to pivot and turn each wheel in a desired direction; independent drive means associated with each wheel to rotate said wheels forward and backward; a power source operably associated with the pivot means and independent drive means; and control means mounted to the frame and associated with the drive means, pivot means, and power source to selectively activate the drive means and pivot means to align and drive each wheel at the desired speed and direction.

17 Claims, 2 Drawing Sheets

MULTI-PURPOSE UNI-BODY DIGGING SERVICE VEHICLE

RELATED APPLICATIONS

This application is a continuation-in-part application of the continuation-in-part application, Ser. No. 568,767, U.S. Pat. No. 5,082,082 filed Aug. 17, 1990 entitled "Multi-Purpose Service Vehicle" of the continuation-in-part application U.S. patent application, Ser. No. 359,277, abandoned filed May 31, 1989 entitled "Multi-Purpose Vehicle" of the originally filed U.S. patent application, Ser. No. 140,671, abandoned filed Jan. 4, 1988 entitled "Multi-Purpose Vehicle".

BACKGROUND OF THE INVENTION

1. Field

This invention relates to multi-purpose vehicles. Specifically, it relates to an improved light weight, highly efficient U-shaped multi-purpose service vehicle particularly adapted for digging, and surface transport applications.

2. State of the Art

Numerous multi-purpose vehicles are known. These vehicles typically employ an X-shaped, or box-shaped frame with a conventional cab on the front, and a cabin or bed attached along the length of the frame, such as the amphibious vehicle designed by Fletcher et al, U.S. Pat. No. 2,923,268. Generally, the conventional multi-purpose vehicle has forward steering wheels and rear drive wheels. When pulling heavy objects, a number of conventional vehicles may be harnessed together in series. This requires a long pulling space to accommodate the aligned vehicles connected in series. These harnessed vehicles are also difficult to turn and cause the rear vehicles to run in the tracks left by the forward vehicles; often times resulting in poor traction of the trailing vehicles. The aligned vehicles, when harnessed, generally move in a longitudinal direction. Non-pivoting wheels of conventional vehicles do not allow significant sideward movement, which makes it necessary to uncouple and recouple the vehicles when it is necessary to move the load laterally.

To shorten the turning radius of conventional vehicles, articulated vehicles, such as those described in Hutt, U.S. Pat. No. 4,249,629, and Domenighetti, U.S. Pat. No. 2,914,065 have been utilized. In other applications, a series of carts pulled by a main drive vehicle may be employed, such as the Fire Fighting and Rescue Apparatus described by P. F. Cummins, U.S. Pat. No. 2,169,581. Although these articulated vehicles enable a series of harnessed vehicles to turn in a shorter radius, they do not solve the problem of the rear aligned vehicles's poorer traction as it travels in the same tracks left by the forward vehicles.

The confined working space in underground mines also requires compactness in self loading hauler (SLH) vehicle designs. As a result, SLH vehicles tend to have a length slightly greater than a light hauling design vehicle. The excessive length is tolerable in a majority of underground operations since the drifts (tunnels) are long in comparison and have a narrow width and low height. The excessive length of the SLH contributed to counter-balancing the oversized payloads. However, the narrow width complicates turning and side slope stability. This requires judicious design of the basic frame structure and the location of the components within it. Low height is not only desirable from an operating stand-point, but is also necessary in order to improve the stability of the SLH.

British Patent 1,203,338 incorporates a conveyor assembly running the length of the bed. It therefore is of a box-like shape rather than a U-shaped vehicle which can nest or interconnect for pulling and pushing articles. British Patent No. 1,059,656 uses a flexible articulated frame shown in FIG. 5, which lifts and bends during lifting to scoop earth. British Patent No. 1,059,656 also incorporates a conveyor system into its bed for materials handling and movement. The conveyor system bed of British Patent No. 1,059,656 thus prevents its use with interchangeable beds or modules.

Moehr, U.S. Pat. No. 3,306,478 is another example of a low profile, self loading hauling and dumping vehicle. Kress, U.S. Pat. No. 4,026,430 is a mobile carrier for large scrap steel carrying boxes. Wardle, U.S. Pat. No. 2,795,430 is a carry-all with claw loading scraper apron to assist in loading. Muotka et al, U.S. Pat. No. 3,520,432 utilizes a box frame which requires a blade 4 to rearwardly transport materials to the rear of the bed. Quenzi, U.S. Pat. No. 4,505,638 is another example of a box frame, utilizing a horizontal pair of tracks along which its bucket travels. Wilson, U.S. Pat. No. 3,235,983 is another earth moving apparatus. Galis, U.S. Pat. No. 3,826,387 is a self loading and self-propelled haulage vehicle. Niva, U.S. Pat. No. 4,556,356 is a U-frame truck for handling and transportation of containers or receptacles. Robb, U.S. Pat. No. 2,679,119 discloses an auxiliary scraper and loading apron. Bodine, U.S. Pat. No. 3,030,715 discloses a sonic wave earth digging and moving machine. Trieschmann, U.S. Pat. No. 3,273,732 is a self loading vehicle and dump gate therefore. Le Tourneau, U.S. Pat. No. 1,891,266 discloses a scraper. Lichtenberg, U.S. Pat. No. 2,654,165 discloses a carry-type scraper with front digger moving means. Countryman, U.S. Pat. No. 3,937,345 is a shovel loader with ejector bucket. Shackley, Canadian Patent No. 681,266 is a vehicle provided with a drag line loader.

Cited for general interest is Cohen, U.S. Pat. No. 4,065,825, and Nishibori, Japan No. 62-125952 showing an all wheel independent steering gear.

The invention described below provides an efficient digging and service vehicle with a centrally located operator station. It has independent wheel drive and suspension which can move laterally, if desired, for greater mobility, and can accommodate a variety of interchangeable loads and service modules attached to a universal pallet structured to be secured within the U-shaped frame.

SUMMARY OF THE INVENTION

The invention comprises a universal U-shaped multi-purpose service vehicle having a U-shaped frame. The uni-body U-shaped frame supports and defines the shape of the vehicle, and has opposing sides with fronts ends connected to a front piece, and rear ends defining an open end. The frame may be adapted to accommodate a number of different types of cabins, beds, and mechanisms designed to fit within the space defined by the U-shaped frame. They may be removable mounted or permanently attached to the frame, depending upon the desired application.

For use in underground hauling, a digging system component may be mounted within the U-shaped frame. Oscillation means may be associated with the bucket of the digging system component to increase bucket load penetration to assist in loading. As the bucket is oscillated up and down, the material being loaded is also given an up and down motion. Since the amount of vertical displacement is different along the longitudinal axis, there is relative motion between the material particles. This loosens up the material, and reduces the compaction caused by the wedging action of the bucket sides.

The oscillation motion of the bucket also tends to break up any arching formed by the bridging of a few large particles near the throat. The result is a significant reduction in the resistance to bucket penetration. Furthermore, loosened material has a smaller internal angle of friction (angle of repose). For a given pile height of material, the loose material will extend farther into the loading head.

The oscillating method is similar to increasing the slump (low to high) of a concrete mix by addition of water to promote the relative movement between aggregate particles. The oscillated bucket of the digging system component accomplishes the same objectives in a dry muckpile.

The effect of loosening material such a a rock pile through oscillation of the bucket (loading head) was confirmed through extensive field tests showing the depth of penetration and the volume of rock contained with the loading head greatly increased. Because of the increased digging efficiency, the size of the power train required to provide tractive effort is significantly less. As a result, the entire power train energy balance is more efficient, requiring much smaller engines to power digging vehicles.

Towards the rear of the U-frame, a cab is mounted to position the operator to view the vehicle's movement and operations. The cab is sized to accommodate the operator, and includes at least one door opening for the operator to enter and exit the cab.

A plurality of wheels are independently suspended and rotatably attached with wheel mounts to opposing sides of the frame. Various types of conventional pivot means may be attached to the wheel mounts to allow each to pivot and independently turn in a desired direction for independent steering. These pivot means allow each wheel to turn up to 25 degrees in a desired direction.

To provide greater mobility and directional steering latitude, the multi-purpose vehicle generally includes separate independent drive motors and steering means for each wheel. Either electrical or internal combustion engine drive motors may be utilized, depending upon fuel supply, availability, and cost. These independent drive motors rotate each wheel in a forward or rearward direction, giving the vehicle wide directional steering latitude. The drive motors are operable associated with the wheels via a conventional transmission drive train to rotate the wheels forward or backward. A power source, such as a conventional combustion engine utilizing hydrostatic wheel drive, is mounted on top and towards the rear of the U-frame beneath the cab to operate the pivot means and independent drive motors. Control means mounted to the frame are associated with drive motors and pivot means to selectively activate them to align and drive each wheel and the vehicle at the desired speed and direction.

Preferably the drive motors are present to run at their optimal efficiency points. A variable speed transmission, such as that described in U.S. Pat. No. 4,856,378, entitled "Variable Speed Transmission", may then be included in the drive train to provide the desired speed and torque to each wheel.

Control means—i.e. a control panel mounted within the cab—are operable associated with the transmission to control the output from the drive motors, and speed of the wheels. The control panel also controls the pivot means to selectively align each wheel in the desired direction.

An auxiliary power such, such as a hydraulic system, may be included, and also controlled by the control panel to selectively operate various components, such as the bucket loader.

In areas with contaminated air, such as in underground mining areas, the multi-purpose vehicle may be operated by remote control. Remote control vehicles are adapted with revolving electronic viewing means, such as a remote control operated camera, capable of receiving and transmitting picture signals. Picture signals are then transmitted to a remote receiver viewing screen via a transmitter. A remote vehicle control system in communication with the control panel is then included to enable an operator to transmit signals to position and operate the vehicle from a distance.

A control panel is mounted within the cab to control the handling and loading and unloading of material in a similar manner to that described above.

As adapted, the universal multi-purpose service vehicle is particularly suited for surface transport, loading, and service operations.

DESCRIPTION OF THE ILLUSTRATED EMBODIMENTS

Figure 1:
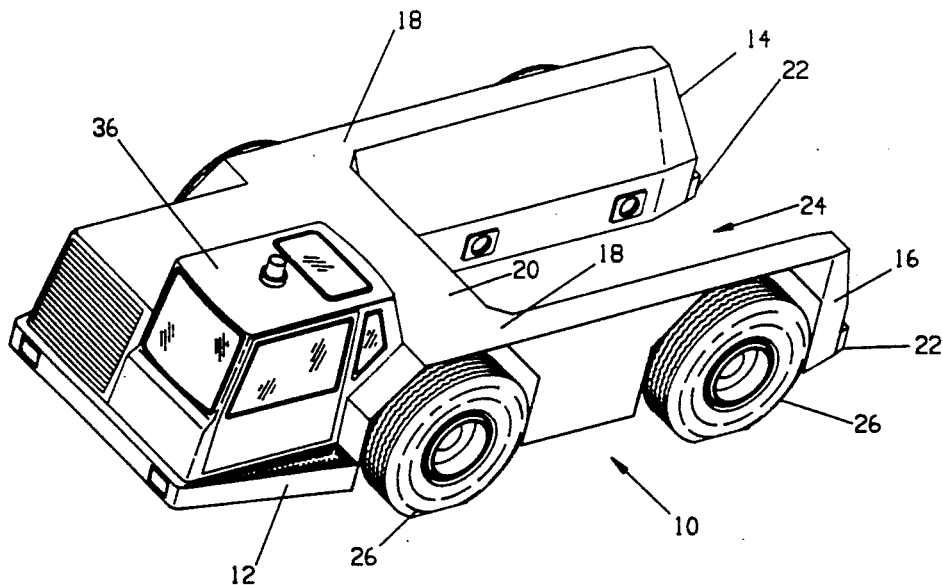
FIG. 1 is a perspective view of a preferred embodiment of the invention.

FIG. 1 illustrates the basic U-shaped multi-purpose service vehicle of the invention 10. The multi-purpose vehicle 10 comprises: a universal uni-body U-shaped frame 12 supporting and defining the shape of the vehicle 10 with opposing sides 14, 16 with front ends 18 connected by a front piece 20. The rear ends 22 of the frame 12 define an open end 24. The open end 24 is of sufficient size and width to accommodate various types of carrying beds and cabins.

Figure 2:
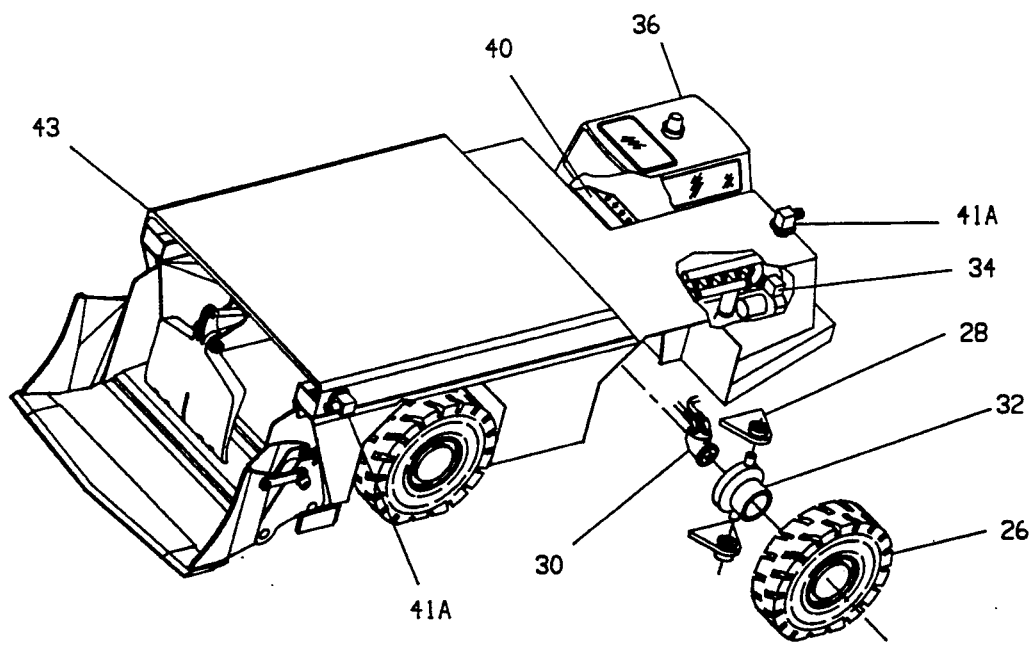
FIG. 2 is a perspective view of another embodiment of the invention.
Figure 2A:
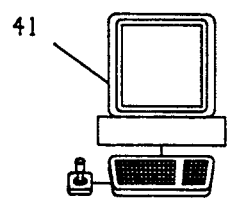
FIG. 2a is a view of a remote control center to control the invention.

A plurality of wheels 26 are independently suspended and rotatably attached with pivoting wheel mounts 28 shown in FIG. 2 to the opposing sides 14, 16 of the frame 12 to independently pivot and turn each wheel 26 for independent steering. Each wheel 26 is associated with an independent drive motor 30 to independently drive said wheels 26 in a forward or rearward direction. A hydrostatic wheel drive 32 is associated with drive motors 30 to provide the desired speed and torque outputs. A power source 34, such as an internal combustion engine, operates the pivot means and independent drive means. A cab 36 mounted towards the front of the frame 12 has a control panel 40 to selectively activate the drive means and pivot means to drive the vehicle 10. A digging and hauling module discussed below is mounted within the U-shaped frame 12, and generally covered with a cover 43 when contaminated materials are transported. Where contaminated air systems are encountered, this embodiment is adapted be operated remotely from a remote control center 41 by an operator responding to pictures sent by a camera 41a mounted on the vehicle 10.

Figure 3:
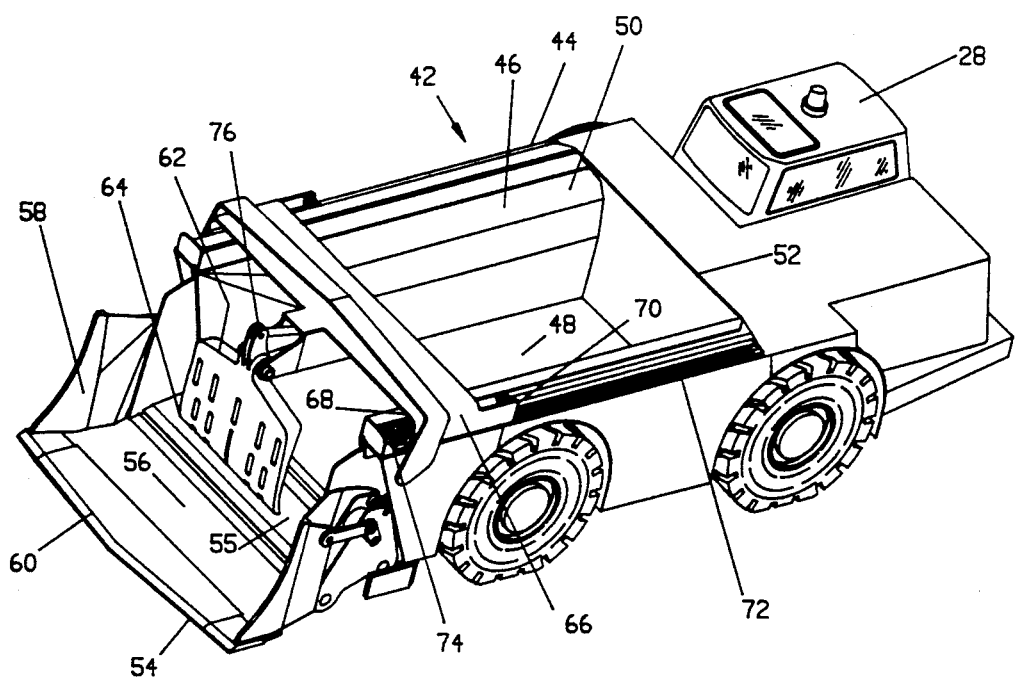
FIG. 3 illustrates a perspective view of the preferred embodiment of the invention shown in FIG. 1 adapted as a gully cleaning system vehicle.

FIG. 3 illustrates the basic U-shaped multi-purpose vehicle 10 shown in FIG. 1 adapted with a gully cleaning system 42. A U-shaped bucket load chamber 44 having opposing sides 46 attached to a bed 48 is tiltably attached to the drive frame 12. The rear bucket load chamber side ends 50 are connected by a back piece 52 to form an open topped U-shaped chamber 44 having a frontal opening 55 leading into an interior load carrying space of the bucket load chamber 44. Preferably, the chamber sides 46 and the back piece 52 are sloped to aid in emptying loads from the bucket load chamber 44, when tilted.

A bucket loader 54 is attached to the sides 46 of the bucket load chamber 44 with transfer means to transfer the contents of the bucket loader 54 into the bucket load chamber 44. The bucket loader has a bottom 56 and opposing sides 58 defining an open topped scoop with open ends. The digging lip 60 of the bucket loader bottom 56 is sharpened to dig and scoop earth, ore, and the like. The sides 58 define a narrowing open bucket loader form front to back to concentrate materials as they are scooped up and forced rearward by the digging lip 60 for discharge into and through the open front end 55 of the bucket load chamber 44. Oscillation means, such as an hydraulic piston or rocker system (not shown), are generally incorporated to provide up to a plus or minus three inch vertical displacement of the digging lip 60 of the bucket loader 54 as it pivots. The frequency of the bucket oscillations is designed to generate from ½ to up to 5 cycles per second. In the field, the operator may manually adjust the frequency and amplitude of the bucket as well as its forward thrust to overcome the resistance of the materials being loaded. Alternatively, an automated self adjusting control system utilizing various mechanical, electrical, and hydraulic means may be built into the hydraulic system to automatically increase the frequency and amplitude of the bucket oscillations and the forward movement of the digging lip 60 to provide the desired materials penetration.

A drag arm 62 the width of the front end opening 55 of the bucket load chamber 44 is pivotally and slideably mounted along the top of the bucket load chamber 44 to assist in emptying the bucket loader 54 to drag large objects from the bucket loader 54 into the bucket load chamber 44. The drag arm 62 has fingers 64 which extend the approximate height of the bucket load chamber front end opening 55. The drag arm 62 is pivotally associated with a pair of slides 66 having first and second ends 68, 70. The slides 66 run along longitudinal parallel top grooves 72 in the exterior sides 46 of the bucket load chamber 44. An hydraulic piston 74 is mounted on each slide 66, with one end secured to the second end 70 of the slide 66 and the other end secured to a rocker 76 attached to the end of the drag arm 62. The drag arm 62 and fingers 64 are selectively tilted up and down by the operation of the hydraulic piston 74. A second drive piston (not shown) is mounted along the top sides 46 of the bucket load chamber 44 to selectively move the slides 66 forward and rearward along the top grooves 72 to extend and retract the drag arm 62.

To move and position the drag arm 62, the pistons 74 are selectively activated by the control panel in the cab 28. The bucket loader 54, may also be simultaneously partially raised and angled to provide gravity assistance in emptying the bucket loader 54.

To dump the bucket loading chamber 44, a dump cylinder (not shown) with one end attached to the U-frame 16 and the other end attached to the bottom of the bucket load chamber bed 48 selectively raises and tilts the bucket load chamber 44 to the dump position. In the first mode, the dumping cylinder selectively lifts and vertically tilts the bottom of the bucket load chamber 44 to unload said chamber through the open front end 60 of the bucket loader 54. After emptying, the dump cylinder then lowers the bucket load chamber 44 for re-filling.

Figure 4:
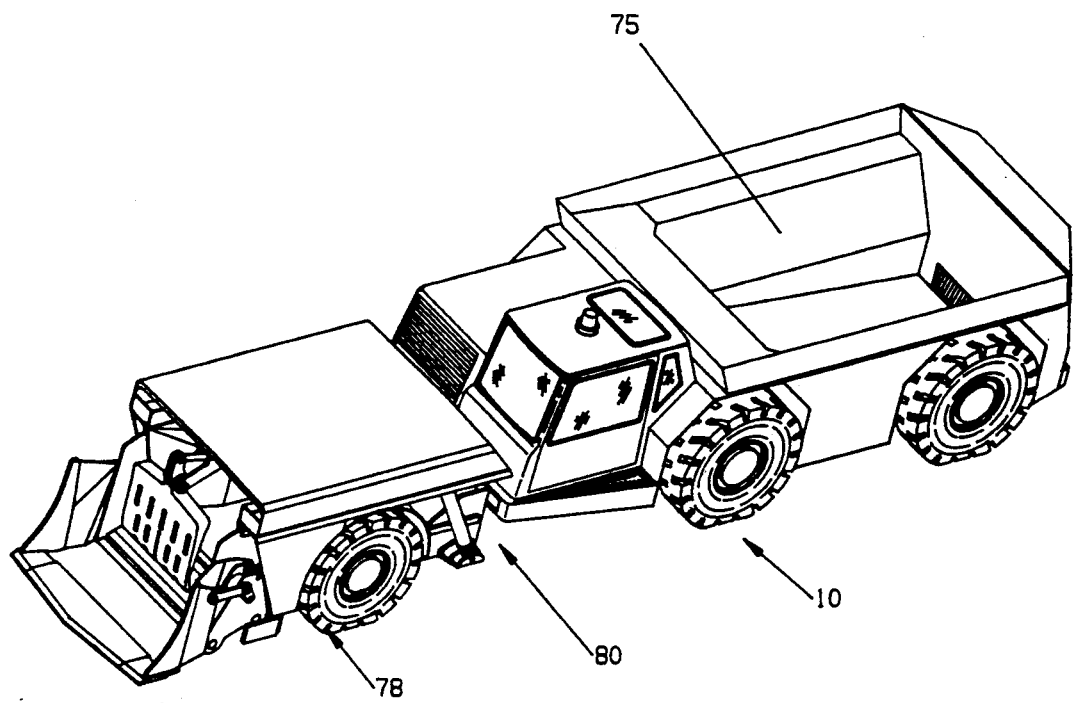
FIG. 4 is a perspective view of the preferred embodiment of the invention shown in FIG. 1 associated with a digging system component.

FIG. 4 illustrates the embodiment of the vehicle 10 shown in FIG. 1 with an earthmover carrying bed module 75 mounted within the U-frame 16. Attached to the front of vehicle 10 with a hinged articulated joint 80 (not shown) is a gully cleaning system 42 similar to that shown in FIG. 3 with its own wheel system 78. The combined length of the vehicle 10 with gully cleaning system 42 is longer than its combined width and height. This enables the vehicle 10 with gully cleaning system 42 to work in confined spaces such as in underground mines.

The invention thus provides a universal vehicle 10 with a basic chassis having a common interface to a number of interchangeable service modules which can be removably or permanently secured within the interior space of the U-shaped frame 16, when not adapted with with a gully cleaning system 42.

Although this specification has made reference to the specific embodiments, it is not intended to restrict the scope of the appended claims. The claims themselves recite those features deemed essential to the invention.

I claim:

1. A U-shaped multi-purpose uni-body digging service vehicle comprising:
   I. at least one multi-purpose vehicle having:
      a. a uni-body U-shaped frame supporting and defining the shape of the vehicle, with opposing sides and rear ends connected by a back piece, and front ends defining an open interior space in communication with an open front end of sufficient size to accommodate respective rear ends of a corresponding U-shaped multi-purpose service vehicle's uni-body U-shaped frame when inserted within an interior space of a corresponding multi-purpose vehicle, said U-shaped frame further including frame structure to secure to the frame within the interior space a plurality of loads,
      b. an open top earthmover carrying module structured to fit within and mounted within the interior of the opening of the U-shaped frame to carry loads,
      c. wheel mounts capable of pivoting attached to the opposing sides,
      d. a plurality of wheels independently suspended and rotatably attached to the wheel mounts,
      e. pivot means associated with the wheel mounts to pivot and turn each wheel in a desired direction, f. independent drive means associated with each wheel to rotate said wheels forward and backward, g. a power source to operate the pivot means and independent drive means, and h. control means mounted to the frame and associated with the drive means, and pivot means to selectively activate the drive means and pivot means to align and drive each wheel at the desired speed and direction; and II. a uni-body U-shaped digging system component mounted within the opening of the frame having:

a. an open top bucket load chamber tiltably mounted to the frame, having opposing sides attached to a bed, with rear side ends connected by a back piece, and front ends defining an opening leading into an interior load carrying space of the chamber, b. a bucket loader having a bottom and sides defining an open top scoop with open ends, the forward open end of the bottom sharpened to dig and scoop earth, ore, and the like into said bucket loader, c. transfer means to transfer the contents of the bucket loader into the bucket load chamber, d. dumping means operably associated with the frame and bucket load chamber to selectively lift and tilt the bottom of the bucket load chamber to unload the contents of said chamber through the open end of the bucket loader in one mode, and to lower and ready the bucket load chamber for receipt of materials in the other mode.

2. A U-shaped multi-purpose uni-body digging service vehicle according to claim 1, including a cab mounted near the front of the frame, said cab sized to accommodate an operator, with at least one door opening for the operator to enter and exit the cab.

3. A U-shaped multi-purpose uni-body digging service vehicle according to claim 1, wherein the dumping means comprises a dump cylinder with one end attached to the frame and the other end attached to the bottom of the bucket load chamber to selectively raise and tilt the bucket load chamber to the dump position with the bucket functioning as an open tailgate when positioned in a dump mode, and to selectively lower and level the bucket load chamber to a load position with the bucket loader functioning as a hauler, when positioned in a loading mode.

4. A U-shaped multi-purpose uni-body digging service vehicle according to claim 1, including: rotatably mounted electronic viewing means capable of receiving and transmitting picture signals attached to the frame, and in communication with a remote receiving viewing screen; and, a remote control in communication with the control means to enable an operator to position and operate the vehicle from a remote position.

5. A U-shaped multi-purpose uni-body digging service vehicle according to claim 1, wherein the drive means and power source comprise at least one electric motor having an electric power source associated with each wheel.

6. A U-shaped multi-purpose uni-body digging service vehicle according to claim 1, wherein the wheels are independently suspended and rotatably attached to the wheel mounts, and including independent drive means associated with each drive wheel to rotate said wheels forward or backward.

7. A U-shaped multi-purpose uni-body digging service vehicle according to claim 1, including oscillation means associated with the bucket loader to provide low frequency oscillation to the bucket loader to assist said bucket loader in digging and scooping material.

8. A U-shaped multi-purpose uni-body digging service vehicle according to claim 7, wherein the bottom of the bucket is oscillated between $\frac{1}{2}$ to 5 cycles per second.

9. A U-shaped multi-purpose uni-body digging service vehicle according to claim 8, wherein the amplitude of the digging head is between plus 3 and minus 3 inches.

10. A U-shaped multi-purpose uni-body digging service vehicle according to claim 1, wherein the bucket loader sidewalls define an open front end in communication with an open rear end forming a channel to funnel scooped materials deposited into the bottom of the bucket loader rearward through the open rear end into the bucket load chamber.

11. A U-shaped multi-purpose uni-body digging service vehicle according to claim 1, wherein the transfer means to empty the bucket loader comprises:

i. mounts having first and second ends slideably mounted within the longitudinal top grooves along the top sides of the bucket load chamber, ii. hydraulic pistons associated with the mounts to selectively move said mounts forward and rearward along the top grooves, iii. at least one drag arm with attachment means attached to the mounts to pivot as a lever, and the other end structured as a hook drag when downwardly pivoted to drag earth, ore, or the like, iv. second hydraulic pistons with one end attached to the mounts, and the other end attached to the drag arm attachment means to pivot the drag arms upward and downward in response to the extension and contraction of the second hydraulic pistons, and v. control means to selectively pivot, extend and rearwardly pull the drag arms to drag ore, rocks, and the like from the bucket loader into the bucket load chamber.

12. A U-shaped multi-purpose uni-body digging service vehicle according to claim 11, including:

a gully cleaning system hingedly attached to the front of the U-shaped frame having:

i. a digging frame with front, back, and opposing sides, ii. an open top bucket load chamber tiltably mounted to the digging frame having opposing sides attached to a bed, with rear side ends connected by a back piece, and front ends defining an opening leading into an interior load carrying space of the chamber, iii. Wheel mounts attached to the opposing sides, iv. a plurality of wheels independently suspended and rotatably attached to the wheel mounts, v. a bucket loader having a bottom and sides defining an open top scoop with open ends, the forward open end of the bottom sharpened to dig and scoop earth, ore, and the like into said bucket loader, vi. transfer means to transfer the contents of the bucket loader into the bucket load chamber, vii. dumping means operably associated with the frame and bucket load chamber to selectively lift and tilt the bottom of the bucket load chamber to unload the contents of said chamber through the open end of the bucket loader in one mode, and to lower and ready the bucket load chamber for receipt of materials in the other mode.

13. A U-shaped multi-purpose uni-body digging service vehicle according to claim 12, wherein the bucket loader sidewalls define an open front end in communication with an open rear end forming a channel to funnel scooped materials deposited into the bottom of the bucket loader rearward through the open rear end into the bucket load chamber.

14. A U-shaped multi-purpose uni-body digging service vehicle according to claim 12 wherein the combined length of the vehicle and the gully cleaning system is longer than its combined width and height.

15. A U-shaped multi-purpose uni-body digging service vehicle according to claim 12, including oscillation means associated with the bucket loader to provide low frequency oscillation to the bucket loader to assist said bucket loader in digging and scooping material.

16. A U-shaped multi-purpose uni-body digging service vehicle according to claim 15, wherein the bottom of the bucket is oscillated between ½ to 5 cycles per second.

17. A U-shaped multi-purpose uni-body digging service vehicle according to claim 16, wherein the amplitude of the digging head is between plus 3 and minus 3 inches.

* * * * *